United States Patent [19]
Yoshioka

[11] Patent Number: 6,163,656
[45] Date of Patent: Dec. 19, 2000

[54] VOICE-CODE-IMAGE-ATTACHED STILL IMAGE FORMING APPARATUS

[75] Inventor: Kenji Yoshioka, Hachioji, Japan

[73] Assignee: Olympus Optical Co., Ltd., Tokyo, Japan

[21] Appl. No.: 09/195,020

[22] Filed: Nov. 18, 1998

[30] Foreign Application Priority Data

Nov. 28, 1997 [JP] Japan ..................................... 9-328709

[51] Int. Cl.$^7$ ................................................. G03B 17/48
[52] U.S. Cl. ............................ 396/429; 396/312; 355/31
[58] Field of Search .................................... 396/311, 312, 396/429; 355/31; 348/64, 207, 333, 334

[56] References Cited

U.S. PATENT DOCUMENTS

| | | |
|---|---|---|
| 5,276,472 | 1/1994 | Bell et al. . |
| 5,644,557 | 7/1997 | Akamine et al. . |
| 5,666,215 | 9/1997 | Fredlund et al. . |
| 5,757,468 | 5/1998 | Patton et al. ............................. 396/312 |
| 5,774,752 | 6/1998 | Patton et al. ............................. 396/312 |
| 5,845,160 | 12/1998 | Patton ..................................... 396/312 |

FOREIGN PATENT DOCUMENTS

| | | |
|---|---|---|
| 0 670 555 A1 | 9/1995 | European Pat. Off. . |
| 681 206 | 11/1995 | European Pat. Off. . |
| 0 717 398 A3 | 6/1996 | European Pat. Off. . |
| 720 121 | 7/1996 | European Pat. Off. . |
| 743 614 | 11/1996 | European Pat. Off. . |

Primary Examiner—David M. Gray
Attorney, Agent, or Firm—Frishauf, Holtz, Goodman, Langer & Chick, P. C.

[57] ABSTRACT

An image processing/editing section visualizes still images input from an image medium on an image display section. While confirming the still images, the user selects, using an operation instructing section, a code image forming mode for forming, on a first medium on which one of the displayed still images is to be formed, a code image indicative of voice information made to correspond to the to-be-formed still image, or a code image non-forming mode for forming only the still image on the first medium.

14 Claims, 10 Drawing Sheets

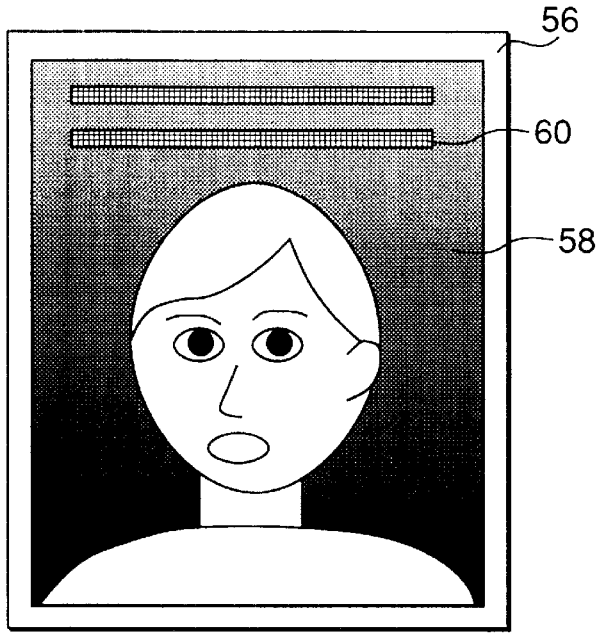
FIG.13
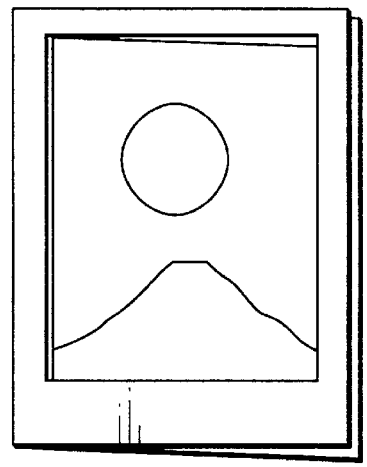
FIG.15A
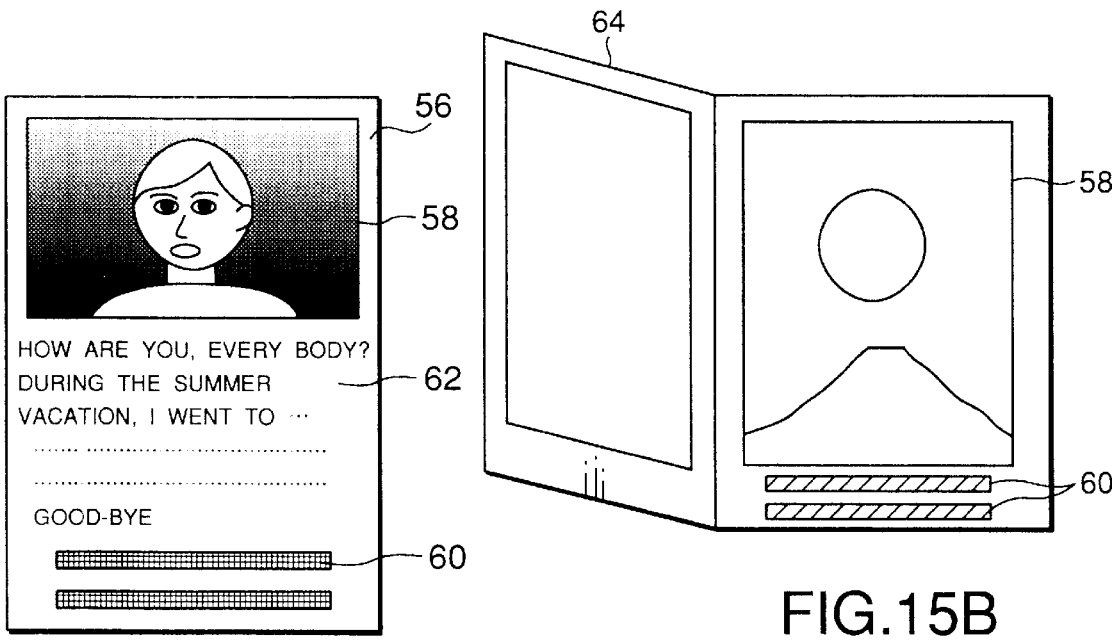
FIG.14
FIG.15B

VOICE-CODE-IMAGE-ATTACHED STILL IMAGE FORMING APPARATUS

BACKGROUND OF THE INVENTION

This invention relates to a voice-code-image-attached still image forming apparatus for forming voice information as an optically readable code image on a predetermined medium, together with a still image.

U.S. Pat. No. 5,276,472 discloses a system capable of integrally printing a picture and an optically readable voice information code related to the picture. This system enables the user to enjoy picture printing and also reproduction of, for example, voice recorded when the picture was photographed, using its exclusive code reader. In this prior art system, in order to encode and print voice information, functions relating to pickup, A/D conversion and recording of voice information are imparted to a camera, recorded voice information is subjected to digital sampling, and the sampling result is recorded in a magnetic recording layer incorporated in a photographic film. The digital voice signal recorded in the magnetic recording layer of the film is read by a magnetic reader, converted into a predetermined encoding format, and recorded as a bar code at an edge portion or a reverse surface portion of a photographic print.

Although bar codes are widely used as means for recording digital information on, for example, a sheet of paper, they have a limited recording capacity since the recording manner is one-dimensional. Therefore, it is substantially difficult to impart voice information to bar codes, and a large capacity information recording medium has been demanded by users.

To meet this demand, the assignee of the present invention is proposing, as disclosed in EP No. 0,670,555 A1 Publication (corresponding to U.S. Ser. No. 08/407,018) now U.S. Pat. No. 5,896,403, an optically readable dot code as means for recording multimedia information of large information capacitance, which includes voice information, image information, digital data, etc., and in which dots are two-dimensionally arranged and the existence or nonexistence of each dot indicates one kind or another kind of one-bit information. Moreover, the assignee has published, in U.S. Pat. No. 5,644,557, a system which integrally prints a still image and a dot code indicative of voice information associated with the still image.

However, in the systems disclosed in U.S. Pat. Nos. 5,276,472 and 5,644,557, it is premised that all pictures photographed have voice information corresponding thereto, and the user's selection as to whether or not voice information is to be added is not particularly taken into consideration.

Actually, there are few cases where voice information is necessary for all of the photographed pictures, and hence it is inconvenient if whether or not to attach voice information to each photographed picture cannot be selected. In other words, if voice information is made to correspond to each of all photographed pictures, not only does the area of a to-be-printed image narrow but also encoding processing for unnecessary voice information increases the processing load.

In addition, it is premised in U.S. Pat. Nos. 5,276,472 and 5,644,557 that a picture image is recorded as a latent image on a film in relation to voice information recorded in the magnetic recording layer of the film. Accordingly, when a voice is input after image photographing, another contrivance is required since the voice input must be done while confirming the contents of images. For example, the user must note down the contents of photographed pictures beforehand.

BRIEF SUMMARY OF THE INVENTION

The present invention has been developed in light of the above, and is aimed at providing a voice-code-image-attached still image forming apparatus wherein voice information as an optically readable code image is to be added to a still image, and which is characterized in that whether or not voice information is to be added to a to-be-printed still image can be selected while the image is displayed and confirmed.

According to an aspect of the present invention, there is provided a voice-code-image-attached still image forming apparatus for making a still image and voice information correspond to each other, forming the still image on a first medium, processing the voice information into an optically readable code image and forming the code image on a predetermined portion of the first medium, comprising:

image display means for visualizing one or more still images recorded in a second medium;

voice information input means for inputting voice information;

encoding means for converting the voice information input by the voice information input means, into code image data corresponding to a code image of a predetermined format;

an operation instructing section to be used by the user to input various instructions; and mode setting means for setting, in accordance with the operation of the operation instructing section, one of a code image forming mode for enabling conversion, into the code image data by the encoding means, of the voice information input by the voice information input means and made to correspond to an optional one of the still images displayed by the image display means, thereby forming the voice information on the first medium as an optically readable code image, and a code image non-forming mode for forming, on the first medium, only an optional one of the still images displayed by the image display means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 13 is a view, showing another example of a voice-code-image-attached still image formed by the voice-code-image-attached still image forming apparatus according to the first embodiment;

FIG. 14 is a view, showing yet another example of a voice-code-image-attached still image formed by the voice-code-image-attached still image forming apparatus according to the first embodiment;

FIGS. 15A and 15B are views, showing other examples of voice-code-image-attached still images formed by the voice-code-image-attached still image forming apparatus according to the first embodiment;

DETAILED DESCRIPTION OF THE INVENTION

Before describing the embodiments of the invention, rough descriptions will be given, in order to facilitate understanding of the invention, of an optically readable dot code as disclosed in EP No. 0,670,555 A1 and used as a code image formed by a voice-code-image-attached still image forming apparatus according to the invention. This dot code is provided with two-dimensionally arranged dots, the existence or non-existence of each of which indicates one or another kind of one-bit information.

Figure 1A:
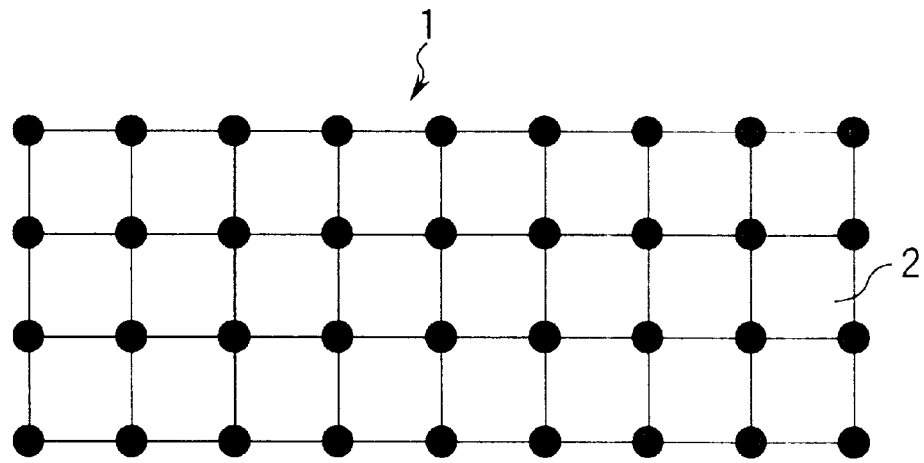
FIG. 1A is a view, showing a conventional dot code as a code image formed by a voice-code-image-attached still image forming apparatus of the invention.

The dot code indicates data relating to, for example, voice information and recorded as an optically readable code on a recording medium in the form of a sheet, such as a paper sheet. As is shown in FIG. 1A, a dot code 1 is constituted of blocks 2 two-dimensionally arranged in a matrix, each of which can contain a predetermined number of dots. Each block 2 which can contain the predetermined number of dots is macroscopically recognized as a predetermined density.

Figure 1B:
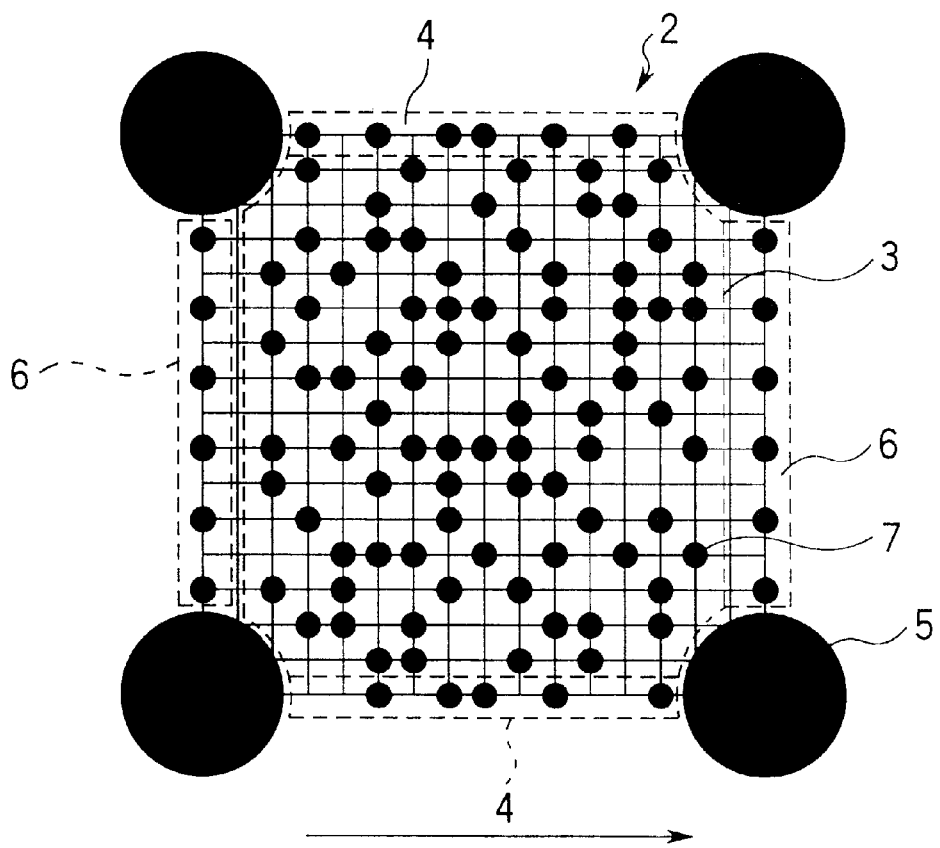
FIG. 1B is a view, showing one of the blocks which constitute the dot code of FIG. 1A.

FIG. 1B is an enlarged view of one block 2 contained in the dot code 1. As is shown in the figure, the block 2 comprises: a data dot pattern section 3 in which dots indicative of modulated data are arranged in accordance with the bit value of the data; a block header section 4 arranged in a predetermined relationship to the data dot pattern section 3 and indicative of information such as an address assigned to the block 2; markers 5 provided at a predetermined location, for example, at the four corners and used for the recognition of the block 2; and a matching dot pattern 6 provided at a predetermined location, for example, between the markers adjacent to each other in a first direction. The block header section 4 is located at a predetermined location to the marker 5, for example, between the markers adjacent to each other in a second direction. The dots arranged in the block header section 4 and the matching dot pattern 6 have the same size as those (hereinafter referred to as "data dots 7") arranged in the data dot pattern section 3. For example, the data dots 7 have a size of 40–80 μm. Further, the marker 5 is a larger dot than the data dots 7, and is formed as a circular dot with a diameter, for example, five times the size of the data dot 7.

Data is modulated before it is recorded as a pattern of data dots 7. The modulation is performed to limit the number of successive data dots 7 in order to discriminate the data dot 7 from the marker 5. If, for example, the diameter of the marker 5 is five times that of the data dot 7, the number of successive data dots must be limited to 4 or less.

Although FIG. 1B shows that the block 2 consists of a grating of 17 data dots×17 data dots, it is not limited to this but may be a grating of 30 data dots×30 data dots or of 40 data dots×40 data dots. It should be noted that the lines which form the grating are imaginary lines.

Reading of the dot code 1 constructed as above will be described. An image of the dot code is picked up by scanning a code reading unit in a direction indicated by the arrow in FIG. 1B. The reading of the dot code image is performed by calculating the accurate coordinates of each marker as a reference position to obtain the accurate position of each data dot 7 from a CCD image photographed over a plurality of frames of the reading unit, and then reading the data dot pattern section 3 within each block 2. The coordinates of each marker 5 are calculated using the feature of the marker that it has a bigger dot size. Thereafter, each matching dot pattern section 6 located between each pair of adjacent markers is searched, thereby obtaining the barycenter coordinates of each pattern dot included in the matching dot pattern 6. From positional information concerning the pattern dots as previously known information, and the barycenter coordinates, the reading reference position for each data dot 7 is calculated using the least square method. For further particulars of the code reading unit, see Publication EP No. 0,717,398 A3 (corresponding to U.S. Ser. No. 08/407,018) filed by the same applicant of the present application.

The embodiments of the invention will now be described with reference to the accompanying drawings.

[First Embodiment]

Voice information is input, before a still image is related to the voice information, to a voice-code-image-attached still image forming apparatus, according to a first embodiment, for forming on a first medium a still image and a voice code image related thereto, which will be described below. Although the first embodiment employs a still image forming method in which an image is printed by, for example, a printer on the first medium such as a paper sheet, the same advantage can be obtained even when a method such as a picture printing method is used in which an image in a negative film is printed on a developing paper as the first medium.

Figure 2:
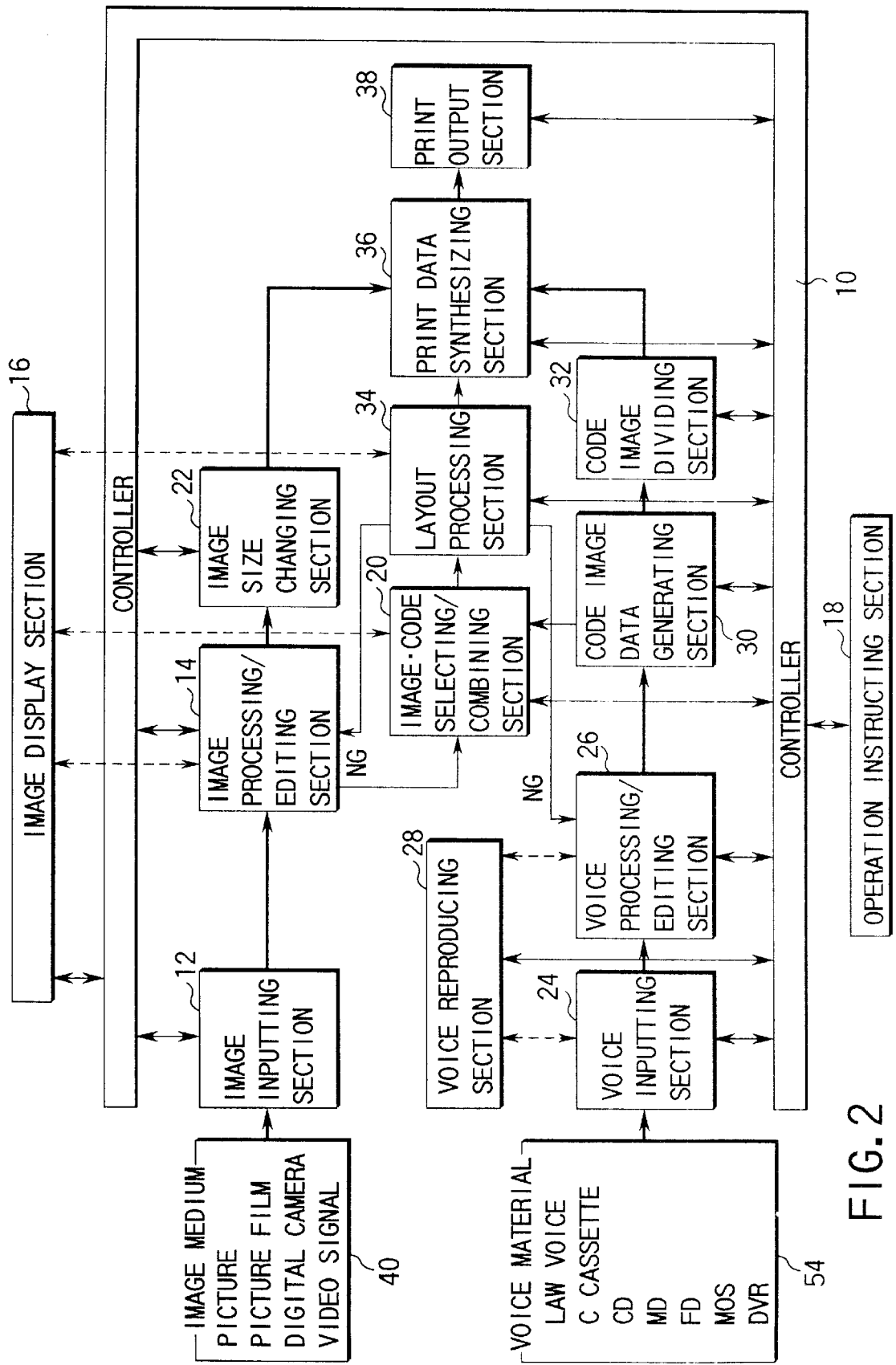
FIG. 2 is a block diagram of a voice-code-image-attached still image forming apparatus according to a first embodiment of the invention.

FIG. 2 is a view, showing the voice-code-image-attached still image forming apparatus according to the first embodiment. The voice-code-image-attached still image forming apparatus comprises a controller 10, an image input section 12, an image processing/editing section 14, an image display section 16, an operation instructing section 18, an image/code selecting/combining section 20, an image size changing section 22, a voice input section 24, a voice processing/editing section 26, a voice reproducing section 28, a code image data generating section 30, a code image dividing section 32, a layout processing section 34, a print data synthesizing section 36 and a print output section 38.

The controller 10 is connected to each section for controlling the operation of each section and the transmission of control information between the sections.

The image input section 12 inputs an image from an image medium 40 as a second medium. The image medium 40 includes a picture (a photographic), a picture film (a photographic film), a digital camera, a video apparatus, etc. The image input section 12 includes a scanner, a film scanner, a digital signal input board, a video signal input board, etc., one of which is selected in accordance with the input image medium 40. When a moving image is input to the image input section 12, it is divided into still images.

The image processing/editing section 14 receives a still image input through the image input section 12, and visualizes it using the image display section 16 such as a CRT. The section 14 further performs generally known image processing of the input still image, such as hue/gradation correction, highlighting, or filtering (e.g. noise removal) of the still image.

Figure 3:
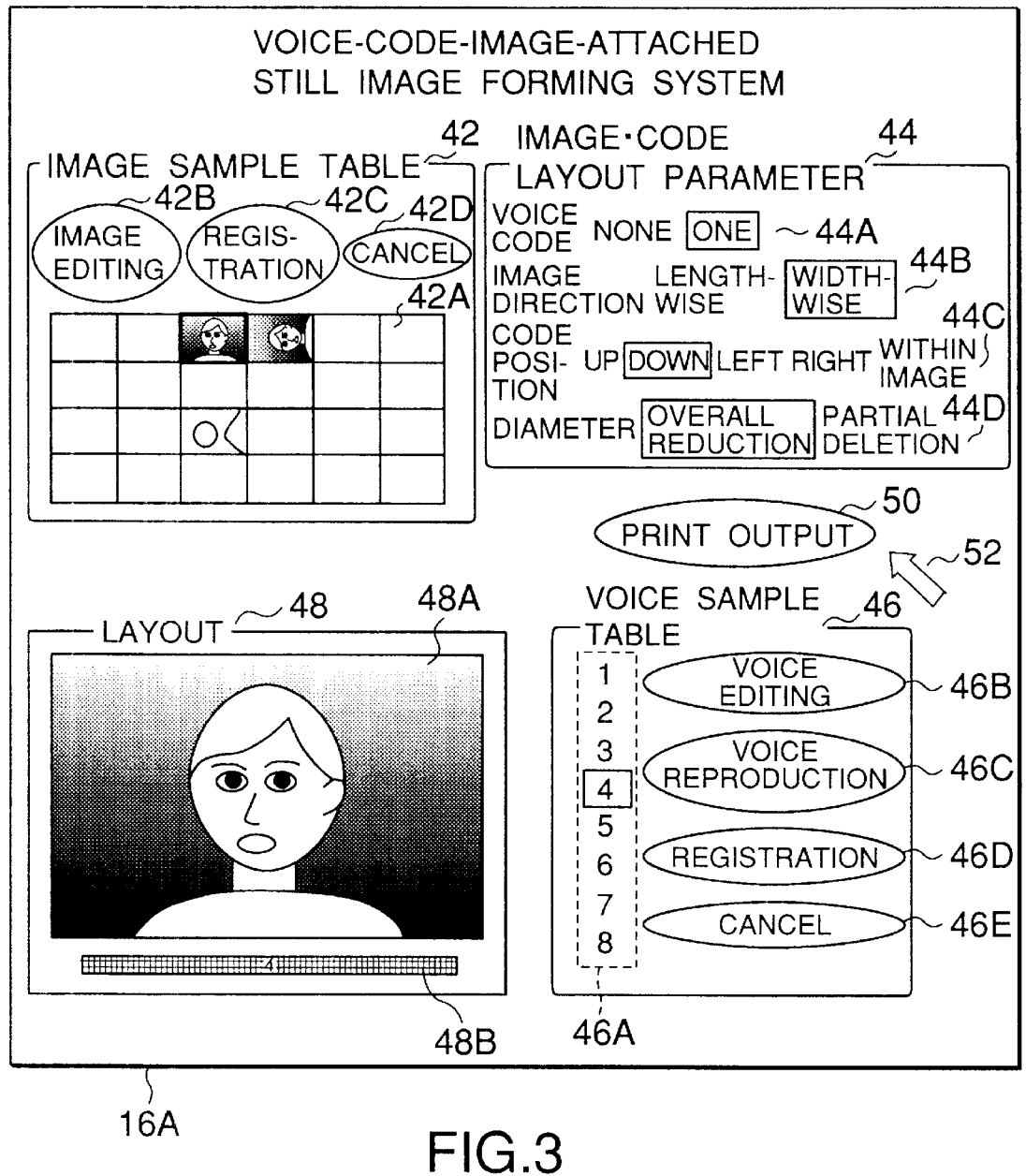
FIG. 3 is a view, illustrating a display screen incorporated in the first embodiment.

The image display section 16 displays various types of information as well as a still image output from the image processing/editing section 14. Specifically, as shown in FIG. 3, the display screen 16A of the image display section 16 displays an image sample table dialogue box 42, an image/code layout parameter dialogue box 44, a voice sample table dialogue box 46, a layout dialogue box 48 for displaying the layout of a voice-code-image-attached still image, a "print output" button 50 for instructing the formation of a voice-code-image-attached still image, and a movable cursor 52 to be used for, for example, operation instruction using a mouse constituted of, for example, the operation instructing section 18.

The image sample table dialogue box 42 includes a sample table 42A for visualizing all input still images, an "image editing" button 42B for the instruction of shift to image editing mode for editing an image selected on the sample table 42A, a "registration" button 42C for instruction of registration, in the layout dialogue box 48, of the image selected on the sample table 42A, and a "cancel" button 42D for the instruction of cancellation of the image registered in the layout dialogue box 48. In the image editing mode, general image processing such as expansion/reduction, rotation, hue/density adjustment, etc. of an image can be performed by the image processing/editing section 14.

The image/code layout parameter dialogue box 44 includes a voice code attachment selecting section 44A for selecting, for example, whether or not a voice code is to be attached, an image direction selecting section 44B for selecting whether the image is arranged lengthwise or widthwise, a code position selecting section 44C for determining the position of a code by selection, and an image size selecting section 44D for determining the size of the image by selection. Where corresponding voice codes are to be attached to an image, the number of voice codes is input to the voice code attachment selecting section 44A.

The voice sample table dialogue box 46 includes a numeral display screen 46A for displaying a table of voice information sample numerals, a "voice editing" button 46B for the instruction of shift to voice editing mode for editing a voice selected on the numeral display screen 46A, a "voice reproduction" button 46C for the instruction of reproduction of the voice selected on the numeral display screen 46A, a "registration" button 46D for the instruction of registration, in the layout dialogue box 48, of the voice selected on the numeral display table 46A, and a "cancel" button 46E for the instruction of cancellation of the voice registered in the layout dialogue box 48.

The layout dialogue box 48 for displaying the layout of a voice-code-image-attached still image displays the layout of a still image 48A selected on the image sample table dialogue box 42, and a voice code image 48B selected on the voice sample table dialogue box 46 and indicative of voice information corresponding to the still image. The voice code image 48B also includes a sample numeral ("4" in FIG. 3) selected on the numeral display screen 46A of the voice sample table dialogue box 46. Further, the layout of the image 48A and the voice code image 48B is performed under the conditions set by the image/code layout parameter dialogue box 44. The relationship between setting of the layout parameters and the resultant layout will be described layer in detail.

Selection of the image 48A and the voice code image 48B is performed not only by operating the "registration" buttons 42C and 46D. For example, there is a method for making a still image correspond to voice information by dragging a sample numeral on the numeral display screen 46A of the voice sample table dialogue box 46 using the cursor 52, and then dropping it onto one of the images displayed on the still image sample table 42A.

The image displayed on the layout dialogue box 48 is output by clicking the "print output" button 50 using the cursor 52.

The operation instructing section 18 in FIG. 2 corresponds to the cursor 52 on the screen 16A in FIG. 3. Concerning the selected still image, outside dimension data necessary for layout processing is sent to the image/code selecting/combining section 20 from the image processing/editing section 14, while image data indicative of an image to be formed on a medium is sent to the image size changing section 22 from the image processing/editing section 14.

On the other hand, the voice input section 24 is provided for inputting a voice or a voice material 54 from a voice recorded device such as a C (compact) cassette, a CD (compact disk), an MD (mini disk), an FD (floppy disk), an MO (magneto-optical disk), a DVR (digital voice recorder), a DVD (digital video disk), etc. The input voice is sent to the voice processing/editing section 26 after it is converted to digital data.

The voice processing/editing section 26 performs general voice processing such as voice quality conversion, voice speed conversion, frequency band conversion, etc. The voice reproducing section 28 reproduces voice data from the voice input section 24 and the voice processing/editing section 26.

Information as to whether a voice code corresponding to a still image, and a voice to be converted to a code are instructed using the operation instructing section 18. When the voice code is to be attached, the selected voice is sent from the voice processing/editing section 26 to the code image data generating section 30.

The code image generating section 30 converts the voice sent from the voice processing/editing section 26, to optically readable code image data in the form of, for example, a dot code shown in FIG. 1A. Concerning the encoded image data, outside dimension data necessary for layout processing is sent to the image/code selecting/combining section 20, and voice code image data indicative of a voice code formed on the first medium is sent to the code image dividing section 32.

When no voice code is to be attached, the image/code selecting/combining section 20 is informed that no voice code is to be attached, by way of the operation instructing section 18 and the controller 10.

Depending upon the case of attachment or non attachment of voice information, the image/code selecting/combining section 20 selects one of code image forming mode for attaching a voice code to a still image formed on the first medium, and code image non-forming mode for forming only a still image on the medium. If the code image forming mode is selected, outside dimension data on a still image and outside dimension data on a code image are sent to the layout processing section 34. If, on the other hand, the code image non-forming mode is selected, only outside dimension data on the still image is sent to the layout processing section 34.

The layout processing section 34 performs processing related to the layout of the still image and its voice code, and the image display section 16 displays the layout result.

After the user confirms the layout result concerning the image 48A and the voice code image 48B, displayed on the layout dialogue box 48 by the layout processing section 34, and operates the operation instructing section 18 to push the "print output" button 50, the image size changing section 22 changes the size of the still image processed and edited by the image processing/editing section 14, to a value in accordance with the set image/code layout parameters, thereby obtaining a still image to be printed.

The code image dividing section 32 divides a single voice code image generated by the code image data generating section 30, into a plurality of codes with a narrow width in accordance with the set image/code layout parameters. In this case, the contents of information stored in the original voice code do not differ from those stored in the entire divided codes.

The print data synthesizing section 36 synthesizes image print data obtained from the image size changing section 22, code image data obtained from the code image dividing section 32, and information related to the layout and obtained from the layout processing section 34, thereby creating a voice-code-image-attached still image to be actually printed on the first medium.

The print output section 38 forms on the first medium the voice-code-image-attached still image generated by the print data synthesizing section 36.

The elements 10–36 shown in FIG. 2 may be incorporated in a personal computer, while the print output section 38 may be formed as a printer connected to the personal computer.

Figure 4:
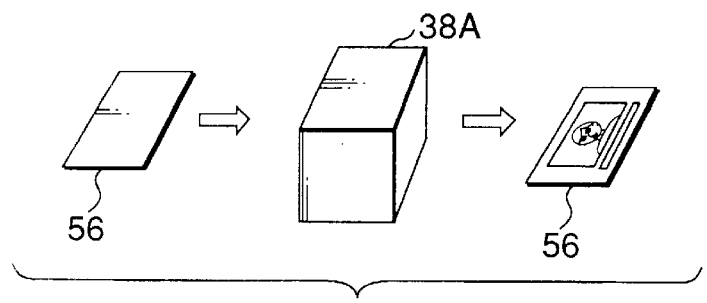
FIG. 4 is a view, useful in explaining a print output section.

FIG. 4 is a view, useful in explaining the print output section 38. A first recording section 38A as the print output section 38 substantially simultaneously forms an image and a voice code image on a first medium 56.

Figure 5:
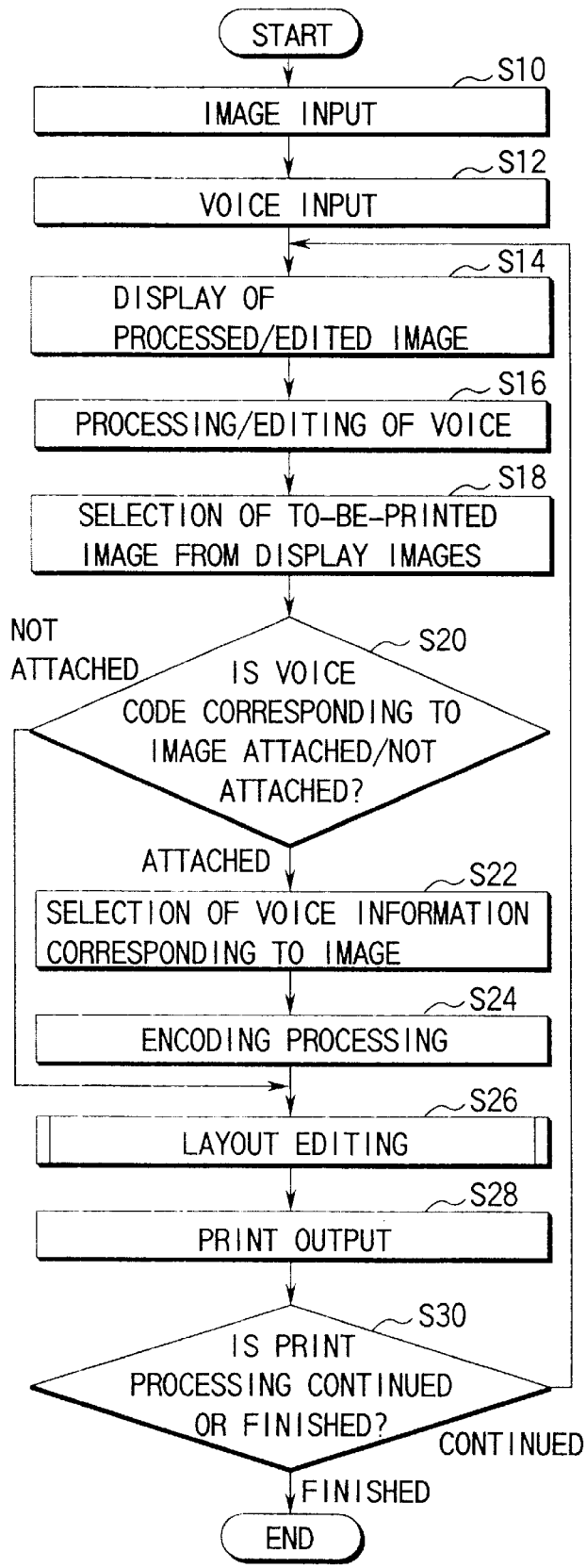
FIG. 5 is a flowchart, useful in explaining the operation of the voice-code-image-attached still image forming apparatus according to the first embodiment.

Referring then to the flowchart of FIG. 5, the operation of the voice-code-image-attached still image forming apparatus will be described.

First, images are input through the image input section 12 (step S10), and voices are input through the voice input section 24 (step S12). The images are then processed and edited by the image processing/editing section 14 and displayed by the image display section 16 (step S14), while the voices are processed and edited by the voice processing/editing section 26 (step S16). Subsequently, a still image to be printed is selected from the displayed images by the image/code selecting/combining section 20 in accordance with the user's instruction made through the operation instructing section 18 (step S18). To form a plurality of still images on a single medium, the user selects a plurality of still images using the operation instructing section 18.

After that, the image/code selecting/combining section 20 selects either attachment or non-attachment of a corresponding voice code to the to-be-printed image in accordance with the user's instruction made through the operation instructing section 18 (step S20). In the case where no corresponding voice code is to be attached to a still image, the program proceeds to a step S26 which will be described later and in which layout editing processing is performed. If, on the other hand, a corresponding voice code is to be attached to a still image, voice information corresponding to the image is selected in accordance with the user's instruction made through the operation instructing section 18 (step S22), and then converted to an optically readable code image by the code image data generating section 30 (step S24). In this case, the voice code image is divided by the code image dividing section 32, if necessary.

After the layout processing section 34 performs layout editing processing of the still image and the voice code image (step S26), the print data synthesizing section 36 synthesizes the still image and the voice code image, and then the print section 38 prints it out (step S28).

Thereafter, whether or not the printing processing is to be continued is determined in accordance with the user's instruction made through the operation instructing section 18 (step S30). If it is continued, the program returns to the step S14, whereas if it is not continued, the processing is finished.

Figure 6:
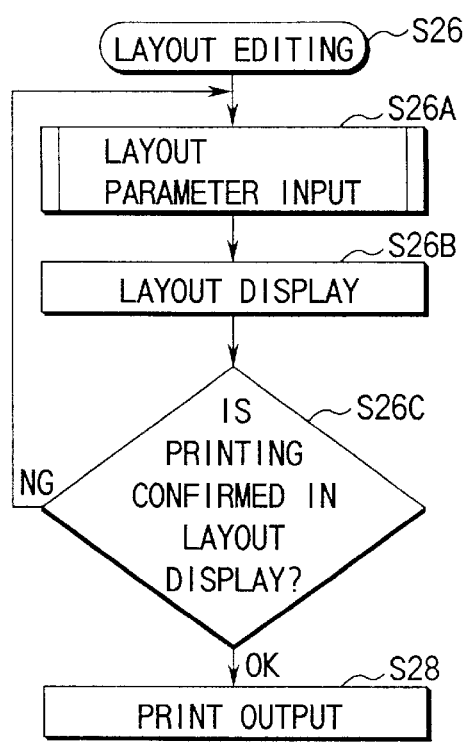
FIG. 6 is a flowchart, useful in explaining, in detail, a layout-editing process appearing in FIG. 5.

At the step S26, the layout editing processing is performed as is shown in FIG. 6.

First, layout parameters as shown in FIG. 3 are input (step S26A), and then the image 48A and the voice code image 48B are displayed on the layout dialogue box 48 in accordance with the input layout parameters (step S26B). The user confirms the layout display (step S26C). If the user instructs to operate the "print output" button 50, i.e. if the user is satisfied with the layout (OK), the program proceeds to the step S28, where the layout image is printed out. If, on the other hand, the user is not satisfied with the layout (NG), the program returns to the step S26A, thereby resetting the parameters using the image/code layout parameter dialogue box 44.

Figure 7:
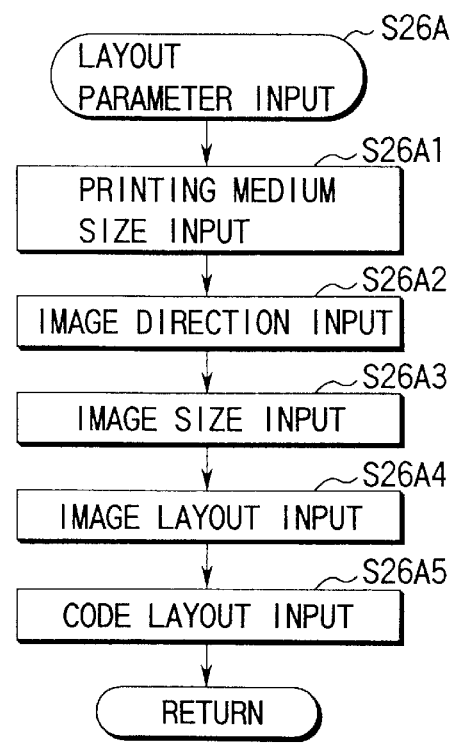
FIG. 7 is a flowchart, useful in explaining, in detail, a layout-parameter input process appearing in FIG. 6.

FIG. 7 is a flowchart, illustrating in detail the input processing of the layout parameters performed at the step S26A.

First, the size of the medium, the direction (lengthwise or widthwise) of the image, the size of the image, the image layout and the code layout are sequentially input in this order at steps S26A1–S26A5, respectively.

Referring then to FIGS. 8A–14, the relationship between setting of image/code layout parameters and a to-be-formed voice-code-image-attached still image will be described.

Figure 8A:
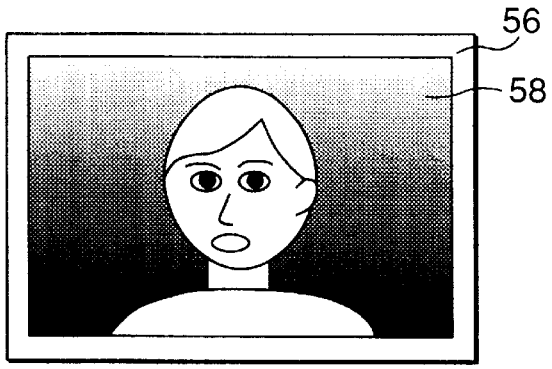
FIGS. 8A–8C are views, showing examples of voice-code-image-attached still images formed by the voice-code-image-attached still image forming apparatus according to the first embodiment.
Figure 8B:
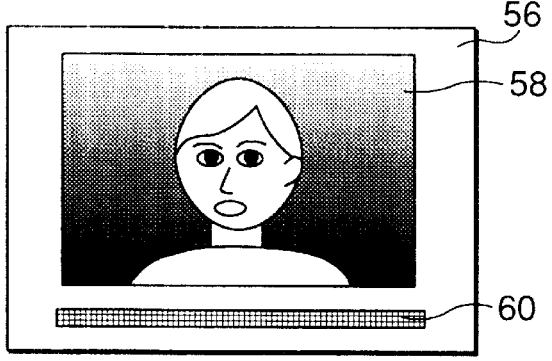
Figure 8C:
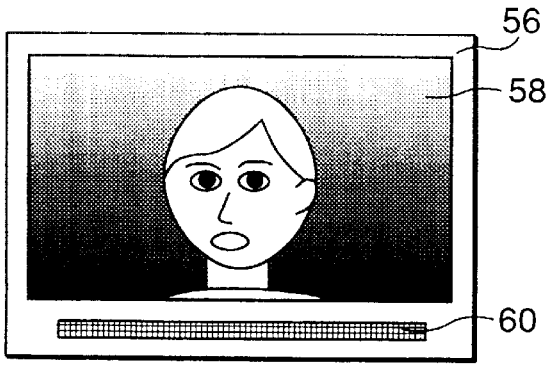

FIGS. 8A–8C show cases where still images of different sizes are formed using the code image forming mode for forming a voice code corresponding to a still image, and the code image non-forming mode for forming only a still image. In other words, still images of different sizes are formed depending upon whether or not a corresponding voice code image is to be attached to a still image.

In the code image non-forming mode for forming only a still image, only the still image 58 is formed on the first medium 56, but no voice code image, as is shown in FIG. 8A.

On the other hand, in the code image forming mode for forming a voice code corresponding to a still image, it is necessary to prepare an area for arranging a voice code image. Therefore, as is shown in FIG. 8B, the still image 58 may be reduced to form a voice code image 60. Otherwise, part of the still image 58 may be cut as shown in FIG. 8C (in this case, lower part is cut).

Thus, the space of a medium of a predetermined size can be effectively used for forming thereon only a still image or a voice-code-image-attached still image.

Referring back to the block diagram of FIG. 2, processing for changing the size of the still image 58 will be described in detail, which is performed in the code image forming mode for forming a voice code corresponding to a still image, or in the code image non-forming mode for forming only a still image.

Suppose that outside dimension data on a selected still image necessary for the layout processing is in the image/code selecting/combining section 20, and image data on the still image is in the image size changing section 22. As described above, in the image/code selecting/combining section 20, either the code image forming mode or the code image non-forming mode is set depending upon whether or not a voice code should be attached.

Where the code image non-forming mode is selected, the layout processing section 34 receives outside dimension information related only to image information, thereby performing layout processing of only the image information. In this case, only the still image 58 is formed on the entire printing medium as shown in FIG. 8A.

On the other hand, where a voice code is to be added, outside dimension data concerning both the image and the voice code image is sent to the layout processing section 34, thereby performing layout processing of the image and voice code. In the layout processing section 34, the space in which the still image 58 is to be formed is narrowed, and the size of the image 58 is determined, in order to secure the space for the voice code image. There are two methods for limiting the image space—one for uniformly reducing the entire image as shown in FIG. 8B, and the other for deleting part of the image as shown in FIG. 8C. The selection of either the one method or the other method can be determined by indicating "overall reduction" or "partial deletion" in the image size selecting section 44D of the image/code layout parameter dialogue box 44 on the operation screen shown in FIG. 3.

The size of the still image 58 determined by the layout processing section 34 is reported to the image size changing section 22 via the controller 10, where the size of the still image 58 is changed. To uniformly reduce the entire image, the entire image is re-sampled. In the case where re-sampling is not performed, part of the image is deleted.

Changing the size of the still image 58 using a selected mode can be also realized in second and third embodiments which will be described later.

Figure 9A:
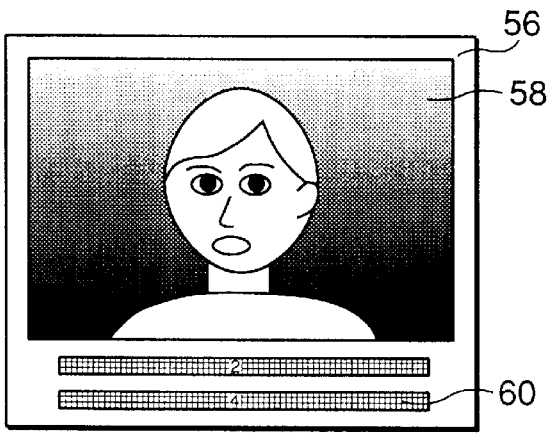
FIGS. 9A and 9B are views, showing other examples of voice-code-image-attached still images formed by the voice-code-image-attached still image forming apparatus according to the first embodiment.
Figure 9B:
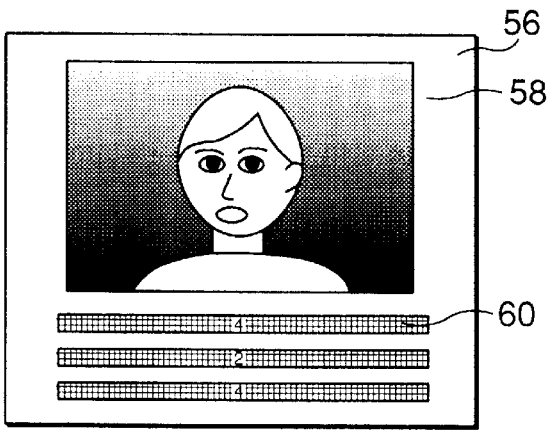

FIGS. 9A and 9B show cases where the size of the still image is changed depending upon the size of a to-be-formed code image if the code image forming mode for forming a voice code corresponding to a still image is selected. FIGS. 8B, 9A and 9B show similar still images photographed at the same time, but having different sizes in accordance with the areas of their code images 60. The greater the area of the voice code image 60, the more the still image 58 is reduced.

Referring again to FIG. 2, the processing for changing the size of a still image in accordance with the area of a to-be-formed code image will be described in detail, which is performed when the code image forming mode for forming a voice code corresponding to a still image is selected.

Suppose that outside dimension data on a selected still image necessary for the layout processing is in the image/code selecting/combining section 20, and image data on the still image is in the image size changing section 22. On the other hand, concerning voice codes, suppose that outside dimension data on all voice codes to be related to images is in the image/code selecting/combining section 20. The outside dimension data on the still image and all the voice codes is sent to the layout processing section 34, whereby layout processing of the image and voice codes is performed. The layout processing section 34 narrows the space in which the still image 58 is to be formed, and determines the size of the image 58, in order to secure the space for all the voice codes 60. The size of the still image 58 determined by the layout processing section 34 is reported to the image size changing section 22 via the controller 10, where the size of the still image 58 is changed. To uniformly reduce the entire image, the entire image is re-sampled. In the case where re-sampling is not performed, part of the image is deleted.

Changing the size of the still image 58 in accordance with the entire area of the voice code images 60 to be related to the still image can be also realized in second and third embodiments which will be described later.

Figure 10A:
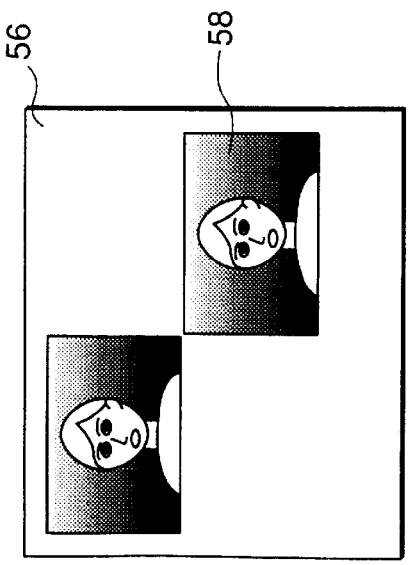
FIGS. 10A and 10B are views, showing further examples of voice-code-image-attached still images formed by the voice-code-image-attached still image forming apparatus according to the first embodiment.
Figure 10B:
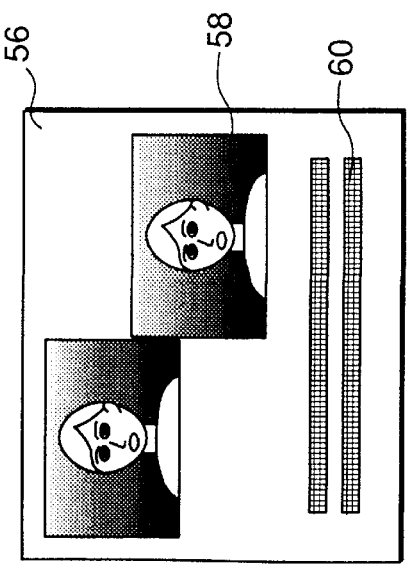

Referring to FIGS. 10A and 10B, a case where a mode for attaching voice code images to images is employed, and where the layout of the images is changed depending upon the total size of the to-be-attached voice code images will be described. Specifically, in FIG. 10A, two still images 58 are formed without any voice code image 60, while in FIG. 10B, the layout of the still images 58 is changed from that of the FIG. 10A to secure the area for voice code images 60. If in FIG. 10B, only one voice code image 60 is to be attached, i.e. if the area required for the voice code image 60 is small, the layout of the still images 58 can be further changed.

Figure 11A:
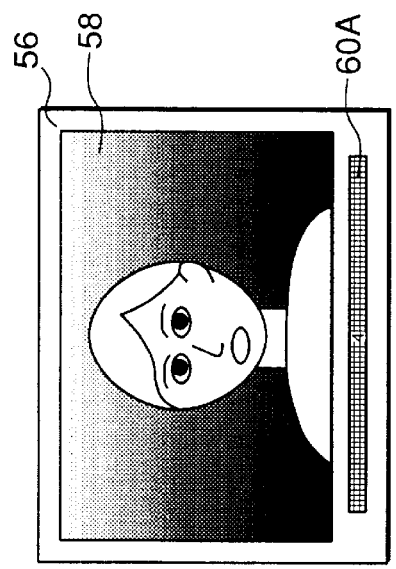
FIGS. 11A and 11B are views, showing yet further examples of voice-code-image-attached still images formed by the voice-code-image-attached still image forming apparatus according to the first embodiment.
Figure 11B:
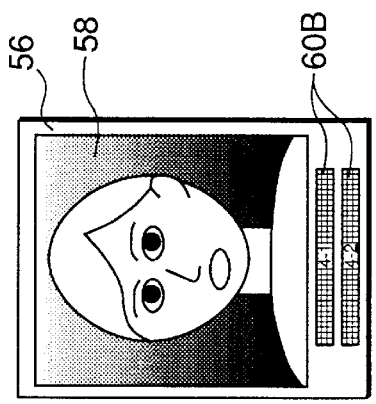

Referring then to FIGS. 11A and 11B, change of the layout of voice code images depending upon the direction (lengthwise or widthwise) of the still image 58 will be described. If the still image 58 is arranged lengthwise, and the space for a voice code image 60A is narrow, the voice code image is divided into two portions 60B and arranged one above the other as shown in FIG 11B. It should be noted that the amount of information recorded in the voice code image 60A is equal to that recorded in the two voice code images 60B.

Figure 12A:
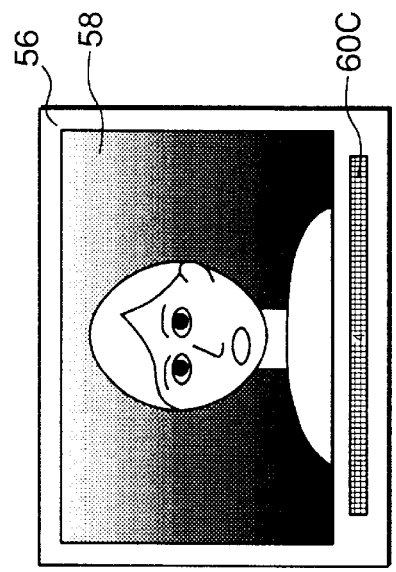
FIGS. 12A and 12B are views, showing other examples of voice-code-image-attached still images formed by the voice-code-image-attached still image forming apparatus according to the first embodiment.
Figure 12B:
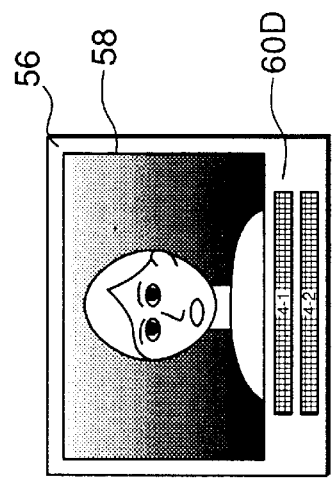

Referring to FIGS. 12A and 12B, change of the layout of a voice code image depending upon the size of the still image 58 will be described. If the screen size is small and hence a voice code image 60C cannot be located in one stage, the voice code image is divided into two portions 60D as shown in FIG. 12B. It should be noted that the amount of information recorded in the voice code image 60C is equal to that recorded in the two voice code images 60D.

FIG. 13 shows an example in which voice code images 60 are arranged within the still image 58. Thus arranging the voice code images 60 within the still image 58 makes unnecessary change of the layout or size of the still image 58. Although the positions of the voice code images 60 in the still image 58 are not limited, it is desirable to arrange them so that the still image 58 will be seen beautiful. To this end, it is preferable that the voice code images are located in a peripheral and low-density portion of the still image.

FIG. 14 shows an example in which the still image 58, the voice code images 60 (i.e. a voice-code-image-attached still image), and characters 62 are laid out.

FIGS. 15A and 15B show an example, in which a window-frame-formed cover 64 is attached to a formed voice-code-attached still image so that the voice code images 60 are concealed and only the still image 58 is seen while the cover 64 is closed. This structure enables protection of the voice code images 60.

It is a matter of course that any examples shown in FIGS. 8A–15B can be combined.

[Second Embodiment]

A second embodiment of the invention will now be described. In a voice-code-image-attached still image forming apparatus according to the second embodiment, voice information is input before still images and voice information are related to each other, as in the first embodiment. However, the second embodiment differs from the first embodiment in the output form of a voice-code-image-attached still image. In the second embodiment, a still image and a voice code image are formed on identical mediums, and then the mediums provided with the still image and the voice code image are combined.

Figure 16:
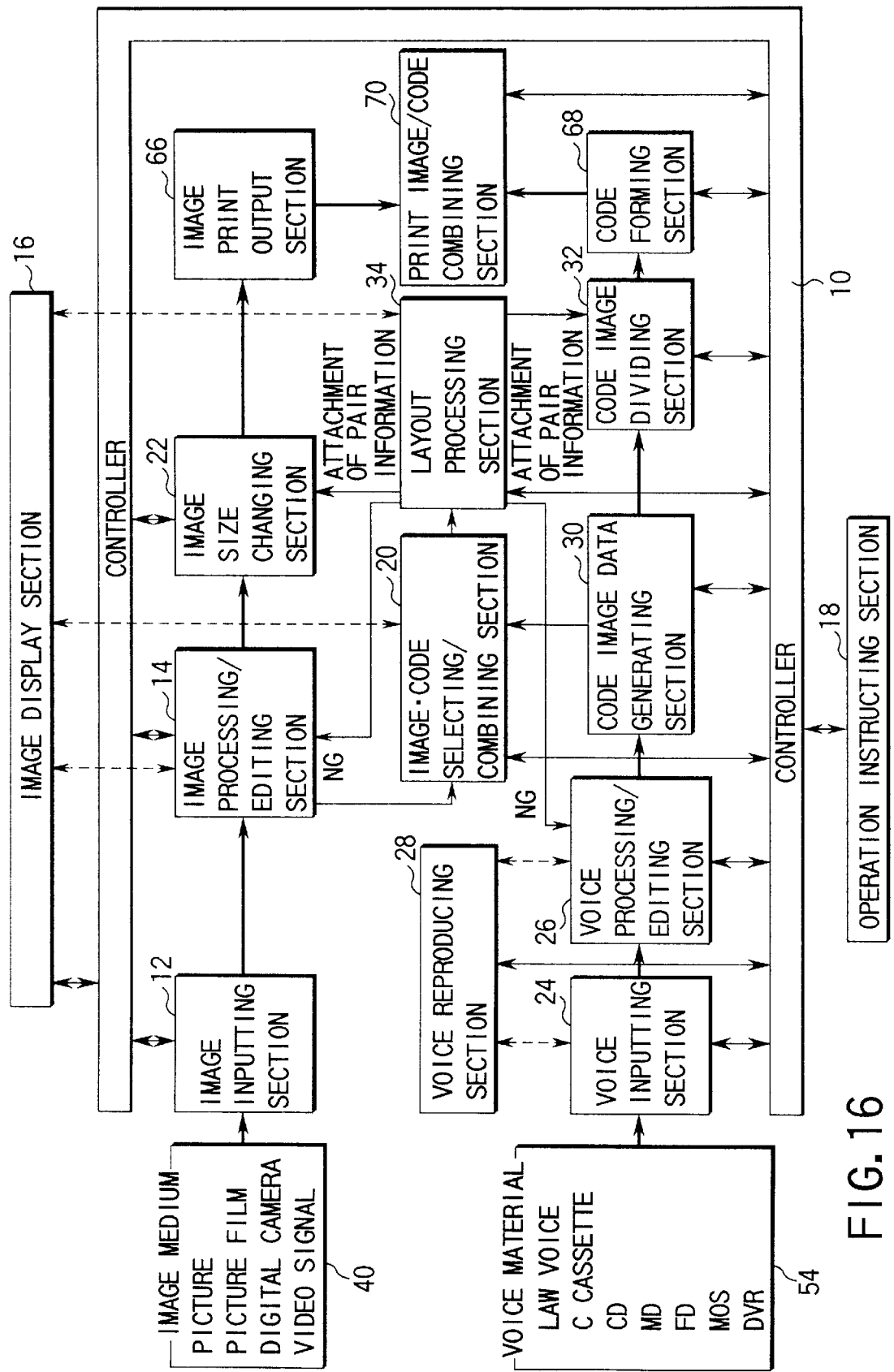
FIG. 16 is a block diagram of a voice-code-image-attached still image forming apparatus according to a second embodiment of the invention.

FIG. 16 is a view, showing the structure of the voice-code-image-attached still image forming apparatus of the second embodiment. The second embodiment incorporates an image print output section 66, a code forming section 68 and a print-image/code combining section 70, in place of the print output section 38 in the first embodiment.

Specifically, each processing section is connected to the controller 10. The controller 10 controls the operation of each processing section and the transmission of control information between the processing sections. The image input section 12 inputs an image from an image medium 40, which includes a picture, a picture film, a digital camera, a video, etc. The image input section 12 includes a scanner, a film scanner, a digital signal input board, a video signal input board, etc., one of which is selected in accordance with the input image medium 40. When a moving image is input to the image input section 12, it is divided into still images. The image processing/editing section 14 receives a still image input through the image input section 12, and visualizes it using the image display section 16. The section 14 further performs generally known image processing of the input still image, such as hue/gradation correction, highlighting, or filtering (e.g. noise removal) of the still image. At this time, a still image to be printed is instructed from the operation instructing section 18 via the controller 10. The operation instructing section 18 corresponds to the cursor 52 on the screen 16A shown in FIG. 3. Concerning the selected still image, image data is sent to the image size changing section 22, while outside dimension data necessary for layout processing is sent to the image/code selecting/combining section 20.

On the other hand, the voice input section 24 inputs a voice or a voice material 54 from a voice recorded device such as a C cassette, a CD, an MD, an FD, an MOS, a DVR, a DVD, etc. The input voice is sent to the voice processing/editing section 26 after it is converted to digital data. The voice data in the voice input section 24 and the voice processing/editing section 26 can be reproduced by the voice reproducing section 28. The voice processing/editing section 26 performs voice quality conversion, voice speed conversion, etc.

Voice information selected by the operation instructing section 18 and to be attached to an image is sent to the code image data generating section 30, where the information is converted to optically readable code image data. This code image data is sent to the code image dividing section 32, and outside dimension data contained therein and related to layout is sent to the image/code selecting/combining section 20.

Figure 17A:
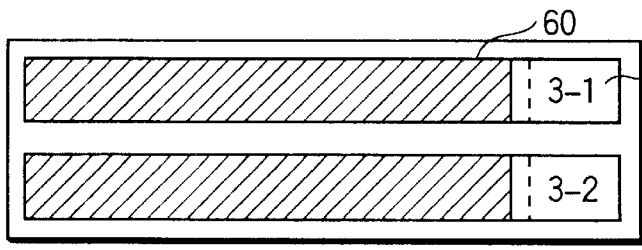
FIG. 17A is a view, showing a medium provided with a voice code image and pair information formed thereon by the voice-code-image-attached still image forming apparatus of the second embodiment.
Figure 17B:
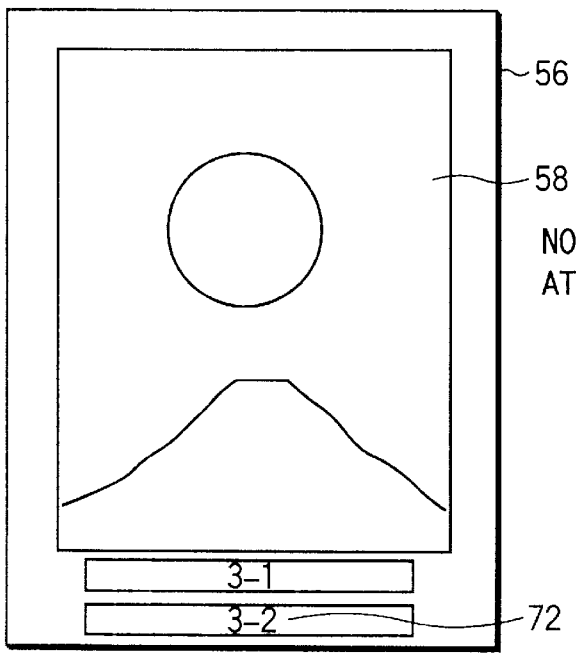
FIGS. 17B and 17C are views, showing examples of mediums on each of which a still image and pair information are formed by the voice-code-image-attached still image forming apparatus of the second embodiment.
Figure 17C:
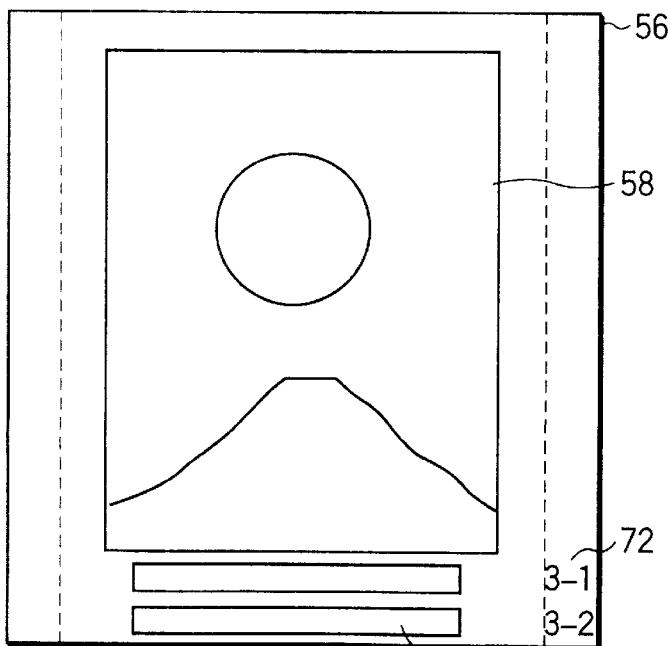

The outside dimension data concerning the still image and voice code sent to the image/code selecting/combining section 20 is further sent to the layout processing section 34, where the data is subjected to processing related to the layout of the still image and voice code. The image size changing section 22 changes the size of the still image to a value suitable for print output in accordance with the set image/code layout parameters. The code image dividing section 32 divides a single voice code image into a plurality of codes of a narrow width in accordance with the set image/code layout parameters. The voice code before the dividing processing has the same contents as the entire divided codes.

Where the code image forming mode is selected, the layout processing section 32 generates pair information indicative of the relationship between a to-be-formed still image and voice code, and sends it to the image size changing section 22 and the code image dividing section 32. A single pair of information items are generated for corresponding image and voice code information items as shown in FIGS. 17A–17C. The pair information may consist of numerals or signs such as alphabet characters.

The image print output section 66 outputs, by printing, a still image with pair information 72 attached thereto, as is shown in FIGS. 17B and 17C. The code forming section 68 forms a voice code image with the pair information 72 attached thereto as shown in FIG. 17A. The pair information 72, "3-1" and "3-2", contains the following meaning: "3" indicates that the image is an image to be formed third, while "1" or "2" indicates the order of divided voice codes.

The print image/code combining section 70 combines the still image with the pair information, with the voice code image with the pair information. This combination can be performed by reading the pair information using a character reader such as an OCR, and then combining the images mechanically or manually.

Figure 18:
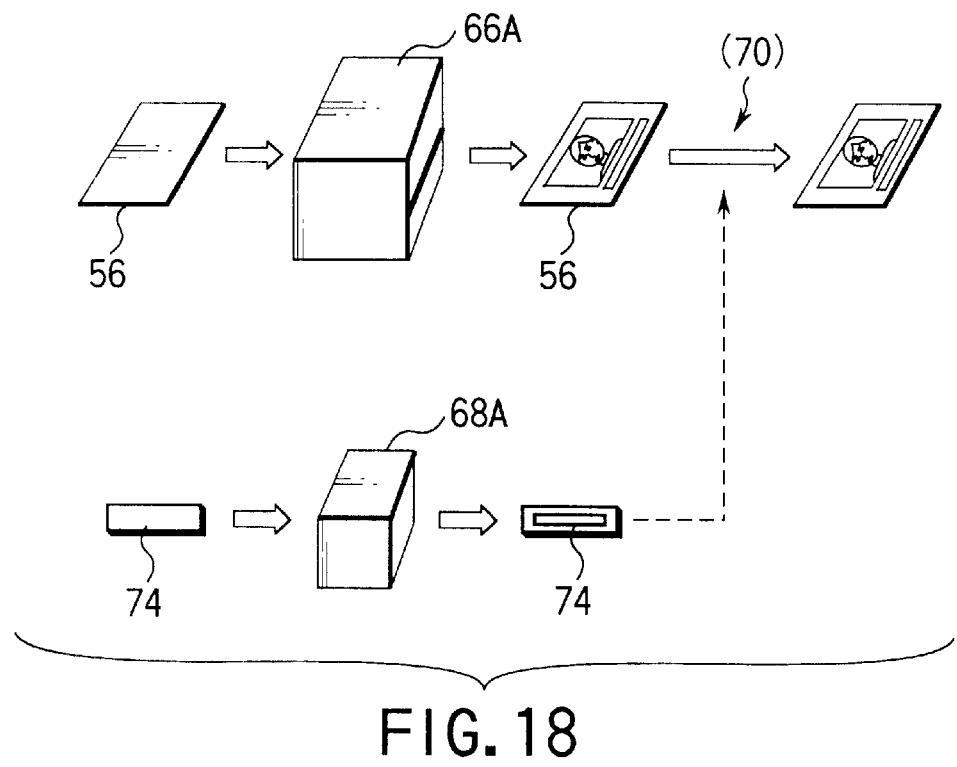
FIG. 18 is a view, useful in explaining an image print output section, a code forming section and print image/code combining section which are incorporated in the voice-code-image-attached still image forming apparatus of the second embodiment.

FIG. 18 is a view, useful in explaining the image print output section 66, the code forming section 68 and the print image/code combining section 70. A first recording section 66A corresponding to the image print output section 66 forms a still image on the first medium 56, and a second recording section 68A corresponding to the code forming section 68 forms a voice code image on a third medium 74. Thereafter, the first medium 56 with the image formed thereon is combined with the third medium 74 with the voice code image formed thereon by the print image/code combining section 70. This combining process is performed manually.

Specifically, the voice code image 60 with the pair information 72 is formed on the third medium 74 as shown in FIG. 17A, while the still image 58 with the pair information 72 is formed on the first medium 56. The pair information 72 attached to the still image 58 has the same contents as that attached to the voice code image 60 corresponding to the image 58. On the basis of the pair information 72, the still image 58 and the voice code image 60, which are formed on the different mediums 56 and 74, can be made to correspond to each other in a reliable manner. In the FIG. 17B case, the pair information 72 is printed on code arrangement portions of the first medium 56, and the voice code image 60 is attached onto the pair information 72. In the FIG. 17C case, the pair information 72 is formed on end portions of the first medium 56 located right hand of predetermined code arrangement portions 76 thereof. In this case, portions outside the broken lines are cut off after the voice code images 60 are attached to the code arrangement portions 76, thereby removing the pair information 72 of the first and third mediums 56 and 74.

Figure 19:
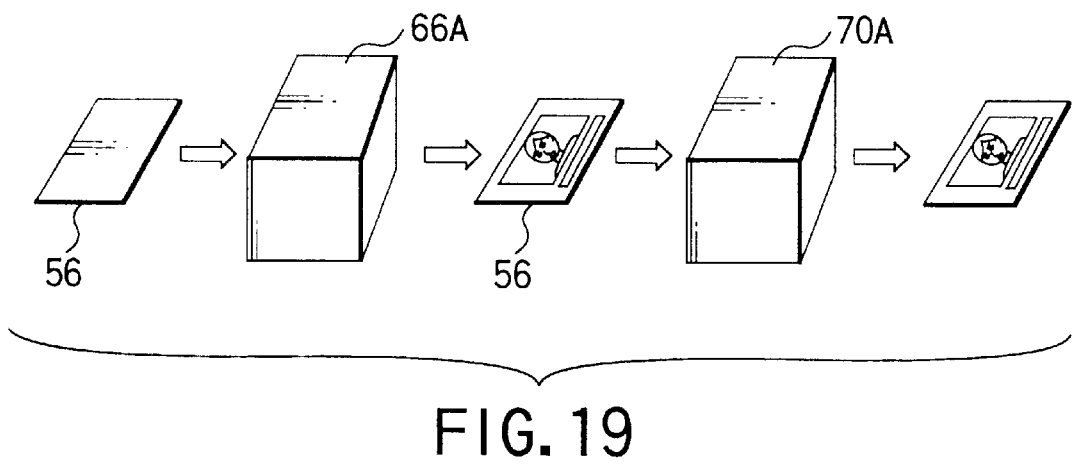
FIG. 19 is another view, useful in explaining an image print output section, a code forming section and print image/code combining section which are incorporated in the voice-code-image-attached still image forming apparatus of the second embodiment.

Alternatively, a voice-code-image-attached still image may be formed on a single medium using different two recording sections, as is shown in FIG. 19. First, a first recording section 66A corresponding to the print output section 66 forms a still image on the first medium 56, and then a second recording section 70A corresponding to the code forming section 68 and the print image/code combining section 70 additionally forms a voice code on the same medium 56, thus completing a voice-code-image-attached still image. In this case, it is important to beforehand secure an area for additionally forming the voice code image.

[Third Embodiment]

A third embodiment of the invention will be described. A voice-code-image-attached still image forming apparatus according to the third embodiment differs from the first and second embodiment in processing for making a still image and voice information correspond to each other. More specifically, in the third embodiment, voice information to be made to correspond to a still image is input when it is made to correspond to the image. Concerning the output form of a voice-code-image-attached still image in this embodiment, a still image and a voice code image may be formed on a single medium as in the first embodiment, or they may be formed on different mediums as in the second embodiment. Only processing for making a still image and voice information correspond to each other, which differs from the processing employed in the first or second embodiment, will be described below.

Figure 20:
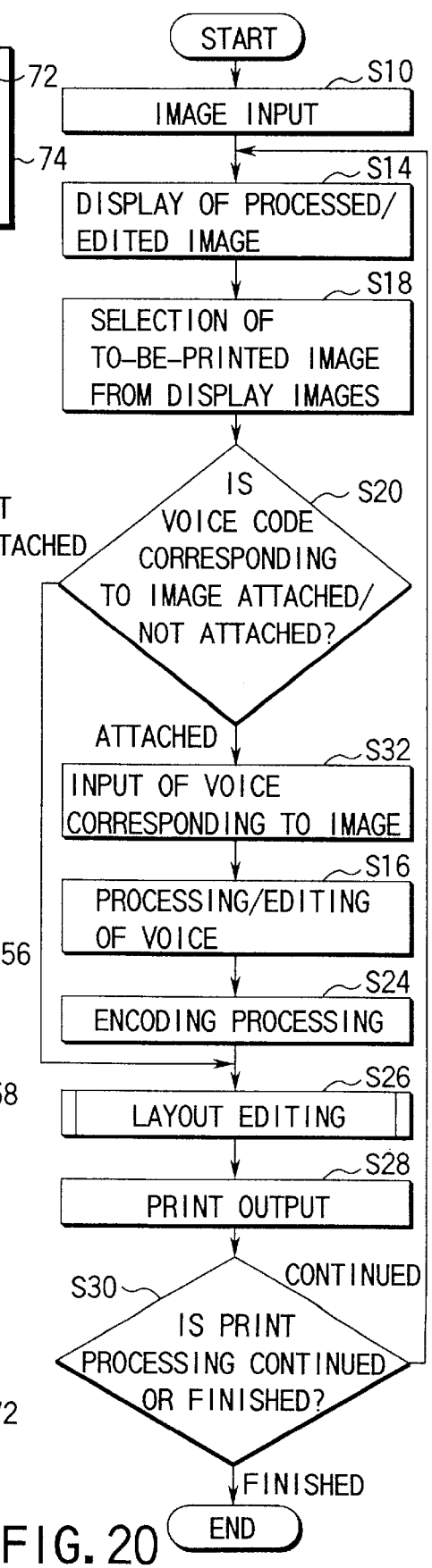
FIG. 20 is a flowchart, useful in explaining the operation of the voice-code-image-attached still image forming apparatus according to a third embodiment of the invention.

FIG. 20 is a flowchart, useful in explaining the operation of the voice-code-image-attached still image of the third embodiment. To clarify the difference between the first and third embodiments, similar process steps in this figure to those of the FIG. 5 flowchart directed to the first embodiment are denoted by corresponding reference numerals.

First, images are input (step S10), and are then processed, edited and displayed (step S14). A still image to be printed is selected from the displayed images (step S18). Where a plurality of still images are to be formed on a single medium, a plurality of still images are selected. Thereafter, either attachment or non-attachment of a voice code corresponding to a to-be-printed image is selected (step S20). In the case where no corresponding voice code is to be attached, the program proceeds to the layout processing at the step S26.

Where, on the other hand, a corresponding voice code is to be attached, voice information corresponding to the still image is input at this stage (step S32). This voice information is processed and edited (step S16), and then converted to an optically readable code image (step S24).

The still image and the voice code image are subjected to layout editing processing (step S26), and then printed out (step S28). Subsequently, it is selected whether or not the processing is to be continued (step S28). If the processing is to be continued, the program returns to the step S14, thereby repeating the processing. If, on the other hand, the processing is not to be continued, it is finished.

Since the layout editing processing at the step S26 and the input processing of layout parameters during the layout editing processing are similar to those performed in the first embodiment and shown in FIGS. 6 and 7, no detailed description will be given thereof.

As described above, in the third embodiment, the processing for making a still image and voice information correspond to each other is independent of the outputting of a voice-code-image-attached still image. Therefore, any desired combination can be realized.

Although the invention is explained on the basis of the embodiments, it is not limited to them, but may be modified in various manners without departing from its scope. The subject matter of the invention can be expressed as follows:

(1) A voice-code-image-attached still image forming apparatus for making a still image and voice information correspond to each other, forming the still image on a first medium (56), processing the voice information into an optically readable code image (60) and forming the code image on a predetermined portion of the first medium, comprising:

image display means (12, 16) for visualizing one or more still images recorded in a second medium (40);

voice information input means (24, 54) for inputting voice information;

encoding means (30) for converting the voice information input by the voice information input means, into code image data corresponding to a code image of a predetermined format;

an operation instructing section (18) to be used by the user to input various instructions; and mode setting means (10) for setting, in accordance with the operation of the operation instructing section, one of a code image forming mode for enabling conversion, into the code image data by the encoding means, of the voice information input by the voice information input means and made to correspond to an optional one of the still images displayed by the image display means, thereby forming the voice information on the first medium as an optically readable code image, and a code image non-forming mode for forming, on the first medium, only an optional one of the still images displayed by the image display means.

The above voice-code-image-attached still image forming apparatus corresponds to the first through third embodiments. This apparatus can select either attachment or non-attachment of a voice code image to an individual still image, without making voice code images correspond to all the still images. As a result, an area for forming a still image can be effectively used, and encoding processing for an unnecessary voice is not required, thereby enabling high-speed image forming processing. Moreover, since in the apparatus, a to-be-formed still image is visualized at the time of making the still image correspond to voice information, so that it can be confirmed with the eyes of the user, the still image can be easily and reliably made to correspond to the voice information, without using any voice input means.

The still image may be formed by a method for printing a digitized image using, for example, a printer, or by a method for printing a negative-film image on a photographic paper, as in the case of picture printing.

(2) A voice-code-image-attached still image forming apparatus as described in item (1), wherein when the code image forming mode is set by the mode setting means, the voice information made to correspond to the optional one of the still images displayed by the image display means is input by the voice information input means before it is made to correspond to the optional still image.

This apparatus corresponds to the first embodiment. Inputting still images and voice information related thereto before they are made to correspond to each other permits images and voices to be continuously made to correspond to each other. Also, since a to-be-formed still image to be made to correspond to a voice is selected from visualized images, thereby making the image to correspond to the voice, any desired correspondence combination of a still image and voice information can be realized irrespective of voice inputted means or the order of voice information items.

(3) A voice-code-image-attached still image forming apparatus as described in item (1), wherein when the code image forming mode is set by the mode setting means, the voice information to be made to correspond to the optional one of the still images displayed by the image display means is input by the voice information input means upon being made to correspond to the optional still image.

This apparatus corresponds to the third embodiment. Visualizing a to-be-formed still image and inputting voice information related to the image when they are made to correspond to each other enables omission of beforehand preparation of corresponding voice information, and permits voice information to be input each time it is made to correspond to a still image. In other words, a voice can be determined and reliably input while observing a visualized still image.

(4) A voice-code-image-attached still image forming apparatus as described in item (1), wherein when the code image forming mode is set by the mode setting means, the code image is directly formed on the first medium on which a still image is to be formed.

This apparatus corresponds to the first embodiment. Since the still image and the code image are formed on a single medium, processing for combining the images, which is required when the images are formed on different mediums, is not necessary. The positional relationship between the still image and the code image can be determined at the time of output, and the relationship can be held permanently.

(5) A voice-code-image-attached still image forming apparatus as described in item (1), wherein when the code image forming mode is set by the mode setting means, the code image is formed on a third medium (74) which differs from the first medium for forming thereon the still images, and the third medium is attached to the first medium.

This apparatus corresponds to the second embodiment. Since the still image and the code image are formed on different mediums, mediums and/or recording sections suitable for the still image and the code image can be selected. In other words, the printing quality of each still image or code image can be controlled. For example, the first medium for the still image can be formed of a lucid paper, while the third medium for the code image can be formed of a non-lucid paper.

(6) A voice-code-image-attached still image forming apparatus as described in item (5), further comprising pair information imparting means (34) for imparting pair information (72) indicative of the relationship between each still image and a corresponding code image to the first medium on which the still image is to be formed, and also to the third medium on which the code image is to be formed.

This apparatus corresponds to the second embodiment. The pair information imparted to both the mediums enables prevention of a mistake of the first medium on which the still image is to be formed, for the third medium on which the code image is to be formed, or vice versa, thereby enabling reliable combination of the images.

(7) A voice-code-image-attached still image forming apparatus as described in item (1), further comprising image size changing means (22) for changing the size of a to-be-formed still image in accordance with the mode set by the mode setting means.

This apparatus corresponds to the first embodiment. A to-be-formed still image is expanded/reduced or partially cut depending upon whether or not a code image corresponding to a still image is to be attached to a to-be-formed voice-code-image-attached still image. When, for example, a voice code image is to be also formed on a medium on which only a still image is to be formed, the area for forming the voice code image is secured in the medium by overall reducing the size of the to-be-formed still image or partially cutting the image. As a result, the medium can be effectively used depending upon whether or not the code image is to be attached.

(8) A voice-code-image-attached still image forming apparatus as described in item (1), further comprising layout processing means (14, 20) for changing the layout of a to-be-formed still image on the first medium in accordance with the mode set by the mode setting means.

This apparatus corresponds to the first embodiment. The layout of a to-be-formed still image on the medium is changed depending upon whether or not a corresponding code image is to be attached. When, for example, a voice code image is to be also formed on a medium on which only a still image is to be formed, the area for forming the voice code image is secured on the medium by changing the layout of the still image. As a result, the medium can be effectively used depending upon whether or not the code image is to be attached.

(9) A voice-code-image-attached still image forming apparatus as described in item (1), further comprising image size changing means (10, 22, 34) for changing the size of a to-be-formed still image in accordance with the size of a to-be-formed code image when the code image forming mode is set by the mode setting means.

This apparatus corresponds to the first embodiment. To increase the amount of voice information in a to-be-formed voice-code-image-attached still image, the size of the image is reduced to secure the area for arranging a code image.

(10) A voice-code-image-attached still image forming apparatus as described in item (1), further comprising layout processing means (10, 22, 34) for changing the layout of a to-be-formed still image on the first medium in accordance with the size of a to-be-formed code image when the code image forming mode is set by the mode setting means.

This apparatus corresponds to the first embodiment. To increase the amount of voice information in a to-be-formed voice-code-image-attached still image, the layout of the image is reduced to secure the area for arranging a code image.

(11) A voice-code-image-attached still image forming apparatus as described in item (1), further comprising layout processing means (10, 20, 32, 34) for changing the layout of a to-be-formed code image on the first medium depending upon whether a to-be-formed still image is arranged lengthwise or widthwise, when the code image forming mode is set by the mode setting means.

This apparatus corresponds to the first embodiment. The layout of a to-be-formed code image is changed depending upon whether a to-be-formed still image is arranged lengthwise or widthwise. For example, the code image is arranged horizontal when the still image is widthwise, while it is arranged vertical when the still image is lengthwise.

(12) A voice-code-image-attached still image forming apparatus as described in item (11), wherein the layout processing means is constructed to divide the to-be-formed code image into a predetermined number of portions.

This apparatus corresponds to the first embodiment. If, for example, the voice code image is located below a still image which has a length and a width different therefrom, the width of the area for arranging the voice code image differs depending upon whether the still image is arranged lengthwise or widthwise. If the code which is arranged along the long side of the still image is changed to be arranged along the short side of the image, the code is divided into a predetermined number of portions.

(13) A voice-code-image-attached still image forming apparatus as described in item (1), further comprising layout processing means (10, 20, 32, 34) for changing the layout of a to-be-formed code image on the first medium in accordance with the size of a to-be-formed still image when the code image forming mode is set by the mode setting means.

This apparatus corresponds to the first embodiment. The layout of a code image is changed in accordance with the size of a to-be-formed still image.

(14) A voice-code-image-attached still image forming apparatus as described in item (13), wherein the layout processing means is constructed to divide the to-be-formed code image into a predetermined number of portions.

This apparatus corresponds to the first embodiment. For example, a voice code image is divided into a predetermined number of portions in accordance with the length or width of a corresponding still image. Accordingly, each voice code image can be arranged in a desirable manner along the length or width of a corresponding still image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A voice-code-image-attached still image forming apparatus comprising:

image display means for visualizing one or more still images;

voice information input means for inputting voice information;

encoding means for converting the voice information input by said voice information input means into code image data corresponding to an optically readable code image of a predetermined format; and mode setting means for setting, in accordance with a user operation, one of (i) a code image forming mode in which a still image to be printed is selected from among the one or more still images visualized by said image display means and voice information input by said voice information input means is made to correspond to the still image to be printed, and in which the voice information is converted into the code image data by said encoding means and the optically readable code image corresponding to the code image data is then formed on a print medium along with the still image to be printed, and (ii) a code image non-forming mode in which the still image to be printed is selected from among the one or more still images visualized by said image display means, without any voice information being made to correspond thereto, and in which only the still image to be printed is then formed on the print medium.

2. A voice-code-image-attached still image forming apparatus according to claim 1, wherein when the code image forming mode is set by said mode setting means, the voice information is input by said voice information input means before being made to correspond to the still image to be printed.

3. A voice-code-image-attached still image forming apparatus according to claim 1, wherein when the code image forming mode is set by said mode setting means, the voice information is input by said voice information input means upon being made to correspond to the still image to be printed.

4. A voice-code-image-attached still image forming apparatus according to claim 1, wherein when the code image forming mode is set by said mode setting means, the optically readable code image is directly formed on the print medium.

5. A voice-code-image-attached still image forming apparatus according to claim 1, wherein when the code image forming mode is set by said mode setting means, the code image is formed on a different medium from the print medium, and the different medium is then attached to the print medium.

6. A voice-code-image-attached still image forming apparatus according to claim 5, further comprising pair information imparting means for imparting pair information indicative of a relationship between the still image to be printed and the optically readable code image to the print medium on which the still image to be printed is formed, and also to the different medium on which the optically readable code image is formed.

7. A voice-code-image-attached still image forming apparatus according to claim 1, further comprising image size changing means for changing a size of the still image to be printed in accordance with the mode set by said mode setting means.

8. A voice-code-image-attached still image forming apparatus according to claim 1, further comprising layout processing means for changing a layout of the still image to be formed on the print medium in accordance with the mode set by said mode setting means.

9. A voice-code-image-attached still image forming apparatus according to claim 1, further comprising image size changing means for changing a size of the still image to be formed in accordance with a size of the optically readable code image when the code image forming mode is set by said mode setting means.

10. A voice-code-image-attached still image forming apparatus according to claim 1, further comprising layout processing means for changing a layout of the still image on the print medium in accordance with a size of the optically readable code image when the code image forming mode is set by said mode setting means.

11. A voice-code-image-attached still image forming apparatus according to claim 1, further comprising layout processing means for changing a layout of the optically readable code image on the print medium depending upon whether the still image to be formed is arranged lengthwise or widthwise, when the code image forming mode is set by said mode setting means.

12. A voice-code-image-attached still image forming apparatus according to claim 11, wherein said layout processing means comprises means for dividing the optically readable code image into a predetermined number of portions.

13. A voice-code-image-attached still image forming apparatus according to claim 1, further comprising layout processing means for changing a layout of the optically readable code image on the print medium in accordance with a size of the still image to be formed when the code image forming mode is set by said mode setting means.

14. A voice-code-image-attached still image forming apparatus according to claim 13, wherein said layout processing means comprises means for dividing the optically readable code image into a predetermined number of portions.

* * * * *